(12) United States Patent
Bernardini et al.

(10) Patent No.: US 11,399,515 B2
(45) Date of Patent: Aug. 2, 2022

(54) LIQUID DISPENSING DEVICE FOR SELECTIVELY DISPENSING A FLUID TO AN ANIMAL

(71) Applicant: TECNIPLAST S.P.A., Buguggiate (IT)

(72) Inventors: Pietro Bernardini, Casciago (IT); Alfredo Campiotti, Malnate (IT); Andrea Maggio, Tradate (IT)

(73) Assignee: TECNIPLAST S.P.A., Buguggiate (IT)

( * ) Notice: Subject to any disclaimer, the term of this patent is extended or adjusted under 35 U.S.C. 154(b) by 0 days.

(21) Appl. No.: 17/252,793

(22) PCT Filed: Jun. 19, 2019

(86) PCT No.: PCT/IB2019/055143
§ 371 (c)(1),
(2) Date: Dec. 16, 2020

(87) PCT Pub. No.: WO2019/244058
PCT Pub. Date: Feb. 26, 2019

(65) Prior Publication Data
US 2021/0244003 A1    Aug. 12, 2021

(30) Foreign Application Priority Data

Jun. 22, 2018 (IT) .......................... 102018000006587

(51) Int. Cl.
*A01K 39/02* (2006.01)
*A01K 7/06* (2006.01)
(52) U.S. Cl.
CPC ............ *A01K 39/0213* (2013.01); *A01K 7/06* (2013.01)

(58) Field of Classification Search
CPC ............................. A01K 7/06; A01K 39/0213
See application file for complete search history.

(56) References Cited

U.S. PATENT DOCUMENTS 6,058,881 A * 5/2000 Thompson ............... A01K 7/06
119/72.5

* cited by examiner

*Primary Examiner* — Joshua J Michener
*Assistant Examiner* — Henry Hooper Mudd
(74) *Attorney, Agent, or Firm* — Abelman, Frayne & Schwab

(57) ABSTRACT

A liquid dispensing device (100), in particular for watering animals, in particular laboratory animals, such as small rodents or the like, said device (100) comprising a main body (101) which defines a longitudinal cavity (1011) for the passage of watering liquids, said longitudinal cavity (1011) being in communication with the outside through a delivery (1002) and a discharge (1001) for introducing said liquids in said longitudinal cavity (1011) and discharging said liquids from said longitudinal cavity (1011) respectively, a valve body (105) and an annular shape elastic sealing element (120) arranged inside said longitudinal cavity (1011), said valve body (105) comprising a stem with a first portion (106) which extends through said annular sealing element (120) and a flange-shaped head (107), wherein said flange-shaped head (107) is kept pressed against said annular sealing element (120) by means of an elastic thrust element (130), and wherein said stem can switch between a first closing position, in which the flow of said liquid downstream of said annular sealing element (120) is prevented by said annular sealing element (120), and a second opening position, in which the flow of said liquids downstream of said annular sealing element (120) is possible.

14 Claims, 5 Drawing Sheets

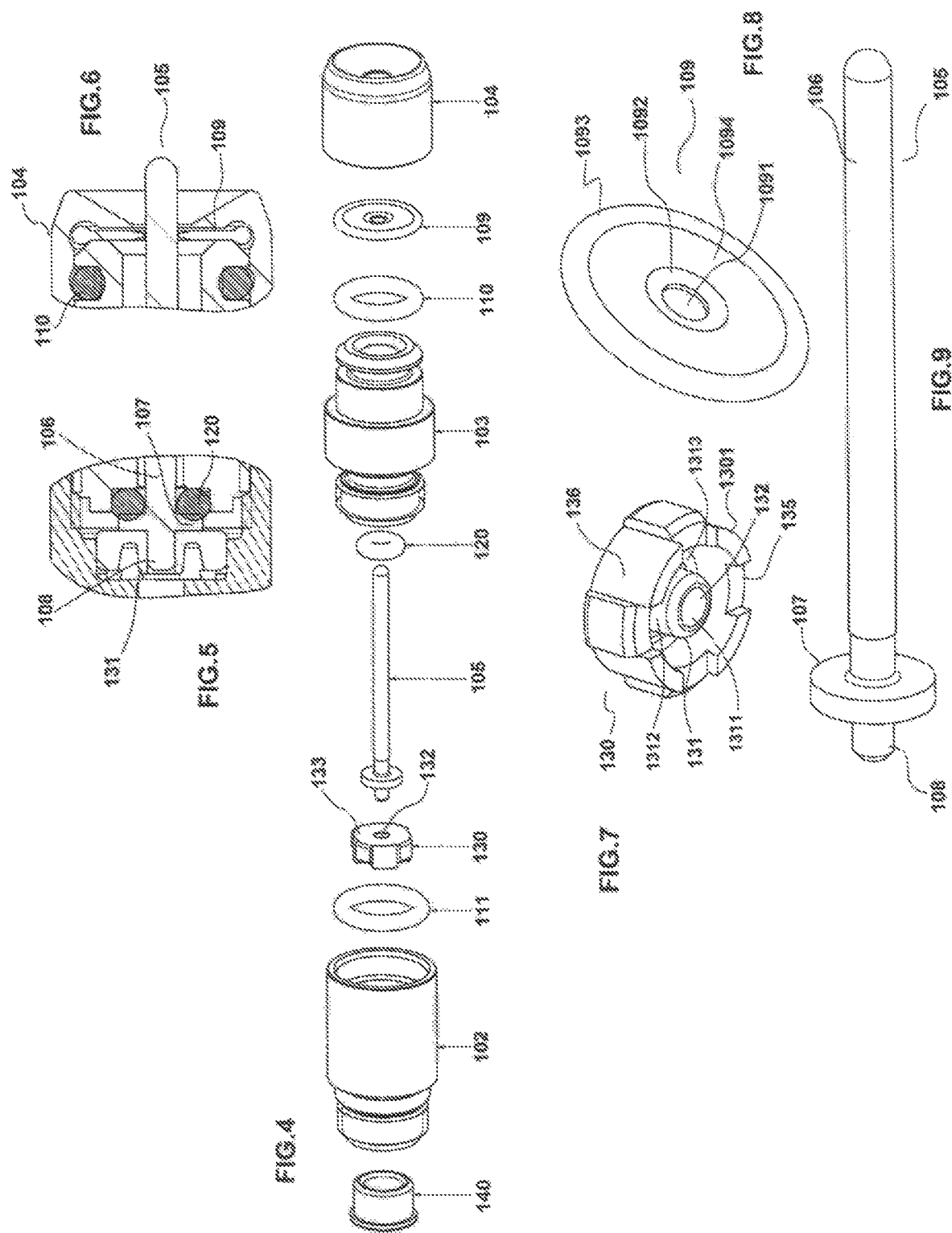

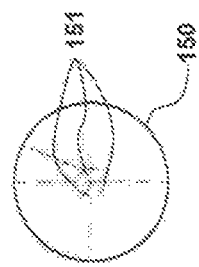
FIG. 11
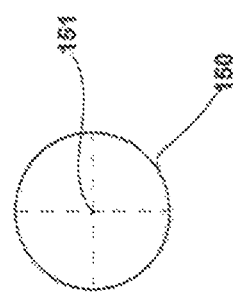
FIG. 10

LIQUID DISPENSING DEVICE FOR SELECTIVELY DISPENSING A FLUID TO AN ANIMAL

CROSS REFERENCE TO RELATED APPLICATION

This application claims benefit under 35 U.S.C. § 371 to international application No. PCT/IB2019/055143 filed on Jun. 19, 2019, which claims priority to Italian application No. 102018000006587 filed Jun. 22, 2018, the contents of which are incorporated by reference in their entireties.

TECHNICAL FIELD

The present invention relates to the field of controlled, in particular automatic, dispensing of liquids. In particular, the present invention relates to the field of controlled, in particular automatic, dispensing of liquids, in the field of animal housing, in particular of laboratory animals, such as small rodents or similar small animals. In detail, the present invention relates to an innovative device for the automatic and/or controlled dispensing of liquids for animals, in particular for laboratory animals. In further detail, the present invention relates to an innovative device of the aforesaid type adapted to be activated (and therefore to dispense liquids) by the animals, such as mice, rats and other relatively small laboratory animals and not only.

BACKGROUND ART

Liquid dispensing devices (also commonly known as valves) for the automatic watering of animals are known in the background art and widely used. In the context of the present invention, and in particular in the following description, the term "watering" is meant as equivalent to each of the terms "abbeveramento" and "abbeverazione" both being commonly used in the technical field of the present invention.

In particular, the advent and increasing use of individually ventilated cages has revealed the need for watering devices characterized by high reliability (possibly free from faults and/or improper operation) in order to prevent, for example, interruptions of supply and/or uncontrolled supply of watering liquids. It is indeed apparent that an interruption, even temporary, in the supply of watering liquids could have irreparable repercussions on health of the animals (and even lead, in the worst case, to the death of the animals themselves), whilst an uncontrolled supply of liquids could result in the flooding of the housing cage, also in this case with the risk of irreparable repercussions on animal health.

It has moreover to be noted that animal health is the essential requirement to ensure the reliability of the laboratory tests to which animals are subjected. Several watering devices for animals have been developed and suggested in the aforementioned field, in particular to guarantee the reliability required by the housing techniques and methods.

In particular, the latest generation of automatic watering devices essentially comprise the following common features.

A main body defines a longitudinal cavity in communication with the outside through an inlet opening and an outlet opening for introducing and discharging the watering liquids, respectively. The hollow body houses the activation mechanism by means of which the animals can open and close the valve, wherein the activation of the valve is achieved by the animal by moving an elongated cylindrical element made of stainless steel, called the needle, which allows the animals to open the valve thereby obtaining a defined amount of water.

Furthermore, the hollow main body houses the sealing mechanism, which is generally made by means of an elastomeric gasket against which a portion of the valve called a needle is pressed by means of an element called the plunger.

In resting or closing condition, the elastic deformation of the gasket due to the pressure applied by the head of the needle as a result of the thrust exerted by the plunger prevents the flow of liquids beyond the (downstream of the) elastic gasket (thereby sealing the system), whereas on the contrary, a displacement of the needle from the rest position results in a loss of contact between the head of the needle and the gasket with consequent flow of liquids (usually water) beyond the (downstream of the) elastic gasket.

Furthermore, in order to allow the needle to return to the resting or closing position (with consequent interruption of the flow of liquids), the devices of the known type are equipped with some elements specifically designed to keep the needle (also named stem) in the resting position (centered with respect to the longitudinal axis of the valve) and to facilitate its return into said position after having been moved by the animal.

Therefore, in practice, according to some of the known solutions, it is the plunger itself which provides at least in part the elastic thrust necessary for the correct repositioning of the needle in the resting or closing position, wherein solutions are known as well which provide, for the purpose, the use of an additional elastic element located downstream of the head of the needle; said further median and distal element, also named centering element, helps the needle to return easily to the resting or closing position parallel to the main axis, thereby ensuring the closing of the device.

The solutions of known type summarized above, although appreciable from many points of view, such as, for example, constructive simplicity and substantially low costs, however, are affected by some disadvantages which are currently at least partially unresolved.

A first disadvantage or problem relates to the fact that the risk of corpuscles (e.g. resulting from the litter and/or food) getting deposited inside the main body is not completely avoided, wherein said corpuscles could counteract the return of the needle into the closing position, wherein with the needle blocked in the opening position the continuous flow of liquids can lead, as mentioned above, to flooding the cage or at least excessively moistening or wetting the litter.

In an attempt to overcome the problem of detritus being deposited in the main body and the respective blocking of the needle, so-called "screened" devices, i.e. devices equipped with a protective screen placed near the outlet opening of the device, have been suggested in the recent past.

However, the screens of the known type, if made of rigid material, while effectively counteracting the depositing of detritus, have been found to be inadmissible or unsuitable for various applications as they excessively hinder the switching of the needle from the closing to the opening position and do not facilitate either the return from the opening to the closing position. On the other hand, if made of softer materials, they often do not effectively counteract the deposit and/or accumulation of detritus in the main body.

Furthermore, some of the known watering devices, in addition to the disadvantages mentioned above, are also affected by problems related to the configuration of the plunger element. This component, in many cases, must provide the necessary elastic force to compress the front of the needle head against the gasket, in order to ensure the sealing of the valve, but must also allow the passage of liquids in case of switching of the needle (from the closing to the opening position) but still facilitating or at least not hindering the opposite switching (from the opening to the closing position).

Often, however, the plunger is distorted or damaged due to the processing in autoclave to which it is subjected during the steps of sterilization of the dispensing device, e.g. by effect of the negative pressure which, combined with the high temperatures present in the autoclaves during the decontamination cycles, can deform and alter the elastic properties of these components. In these cases, the replacement of the element is necessary because damaged plunger devices may cause flooding and/or no longer be able to supply the nominal water flow rate.

DESCRIPTION OF THE PRESENT INVENTION

It is therefore the object of the present invention that of overcoming or at least minimizing the drawbacks found in the solutions according to the prior art, in particular in the liquid dispensing devices with needle or stem configured valve element.

In particular, it is one of the aims or objects of the present invention is to find a solution which allows the effective screening of the outlet opening of the device, thus avoiding the deposit and/or accumulation of debris in the main body of the device itself, in particular without hindering (or making it too difficult for the animal) the switching of the needle or stem from the closing to the opening position, whilst indeed, on the contrary, promoting the opposite switching from the opening to the closing position.

Moreover, it is a further object of the invention to suggest a screening of the above type that is simple to be produced and implemented, as well as feasible at low cost.

It is a further object of the present invention to suggest a plunger centering element with improved features, which acts effectively thereby ensuring both the necessary pressure on the gasket by the head of the needle, and at the same time the re-switching of the needle from the opening to the closing position, and without hindering the switching of the needle from the closing to the opening position.

In view of the drawbacks affecting the solutions according to the prior art and of the objects summarized above, according to the present invention there is suggested a liquid dispensing device, in particular for watering animals, in particular laboratory animals, such as small rodents or the like, said device comprising a main body which defines a longitudinal cavity for the passage of watering liquids, said longitudinal cavity being in communication with the outside through an inlet and an outlet for introducing said liquids in said longitudinal cavity and discharging said liquids from said longitudinal cavity, respectively, an annular elastic sealing element arranged inside said longitudinal cavity, said valve body comprising a stem with a first portion which extends through said annular sealing element and a flange-shaped head, wherein said flange-shaped head is kept pressed against said annular sealing element by means of an elastic thrust element, and wherein said stem is adapted to be switched between a first closing position, in which the flow of said liquids downstream of said annular sealing element is prevented by said annular sealing element, and a second opening position, in which the flow of said liquids downstream of said annular sealing element is possible, wherein said dispensing device comprises a disc-shaped element made of elastomeric material and fixed to said main body at said outlet, wherein said disc-shaped element defines a hole substantially coaxial with said longitudinal cavity through which said first portion of said stem extends, and wherein the switching of said stem from said first closing position to said second opening position occurs against the elastic bias exerted by said disc-shaped element, while, on the contrary, the switching of said stem from said second opening position to said first closing position is promoted by the elastic thrust exerted by said disc-shaped element.

According to an embodiment, said stem, at said hole of said disc-shaped element has an outer diameter which substantially corresponds to the diameter of said hole of said disc-shaped element.

According to an embodiment, said disc-shaped element, near said central hole, comprises a circular-crown-shaped portion with tapered cross section and increasing thickness from the edge of said central hole towards the outer peripheral edge of said disc-shaped element.

According to an embodiment, the thickness of said circular-crown-shaped portion of said disc-shaped element increases from a minimum thickness in a uniform manner and substantially proportionally to the radial distance from said edge of said central hole.

According to an embodiment, said circular-crown-shaped portion has an inner diameter which substantially corresponds to the diameter of said central hole and an outer diameter which is smaller than the maximum diameter of said disc-shaped element.

According to an embodiment, the disc-shaped element is housed inside said main body.

According to an embodiment, said disc-shaped element, at its outer peripheral edge, comprises a substantially toroidal portion.

According to an embodiment, said substantially toroidal portion comprises a portion defined by the revolution of a semi-circumference with respect to a rotation axis perpendicular to said disc-shaped element.

According to an embodiment, said elastic thrust element comprises an engagement portion which defines a substantially cylindrical engagement cavity in which a second portion of said stem opposite to said first portion is housed, and wherein said elastic thrust element comprises a circular-crown-shaped base which extends radially from said engagement portion and is placed in contact with said flange-shaped head of said valve element on the opposite side with respect to said annular sealing element.

According to an embodiment, said second portion of said stem is housed in said cylindrical engagement cavity of said thrust element by interference.

According to an embodiment, said elastic thrust element comprises a substantially cylindrical side wall which extends from said circular-crown-shaped base in the same extension direction as said engagement portion.

According to an embodiment, said substantially cylindrical cavity is blind or closed at the end of said second portion of said stem.

According to an embodiment, said engagement portion has a substantially frustoconical outer surface narrowing towards the end opposite to said circular-crown-shaped base.

According to an embodiment, said substantially cylindrical side wall which extends from said circular-crown-shaped base comprises extension portions the longitudinal extension of which is smaller than the maximum longitudinal extension of said substantially cylindrical side wall, wherein each of said portions with smaller longitudinal extension defines a notch or slot which extends from the free edge of said substantially cylindrical wall opposite to said circular-crown-shaped base.

According to an embodiment, the thickness of said substantially cylindrical wall at said notches or slots is greater than the thickness of the portions of said wall adjacent to said notches or slots.

Further possible embodiments of the present invention are defined in the claims.

BRIEF DESCRIPTION OF THE FIGURES

Hereinafter, the present invention will be clarified by means of the following detailed description of the embodiments depicted in the drawings. However, the present invention is not limited to the embodiments described hereinafter and depicted in the drawings; on the contrary, all the variants of the embodiments described below and depicted in the drawings which will be apparent to a person skilled in the art fall within the scope of the invention.

In the drawings:

FIG. 4 shows an exploded perspective view of a dispensing device according to an embodiment of the present invention;

FIGS. 5 and 6 show longitudinal section views of portions of a dispensing device according to an embodiment of the present invention;

FIG. 7 shows a perspective view of a plunger element of a dispensing device according to an embodiment of the present invention;

FIG. 8 shows a perspective view of a disc-shaped screening element of a dispensing device according to an embodiment of the present invention;

FIG. 9 shows a perspective view of a needle-shaped valve element of a dispensing device according to an embodiment of the present invention;

FIGS. 10 and 11 each show a section view and a plan view of a diaphragm element of a dispensing device according to an embodiment of the present invention.

DETAILED DESCRIPTION OF THE PRESENT INVENTION

The present invention applies in particularly advantageous manner to the field of watering of animals, in particular of laboratory animals, such as small rodents or the like, this being the reason why the present invention will be clarified below with (possible) reference to its application to the watering of animals, in particular of animals of the aforesaid type.

The possible applications of the present invention are however limited to watering, but on the contrary comprise all those applications in which a controlled and/or automatic dispensing of liquids is required.

Figure 1:
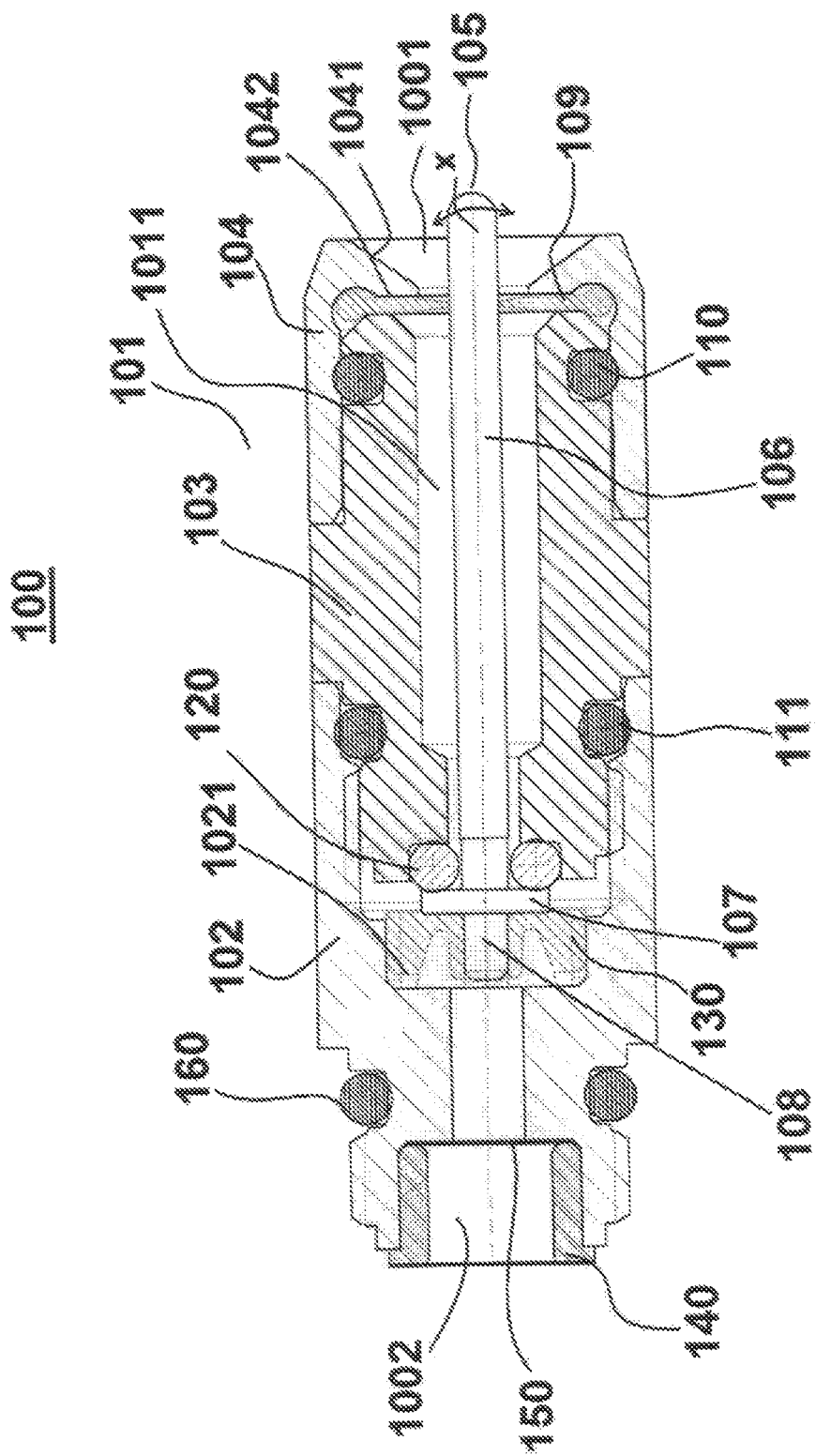
FIGS. 1 and 2 show a longitudinal section view of a dispensing device according to an embodiment of the present invention.
Figure 2:
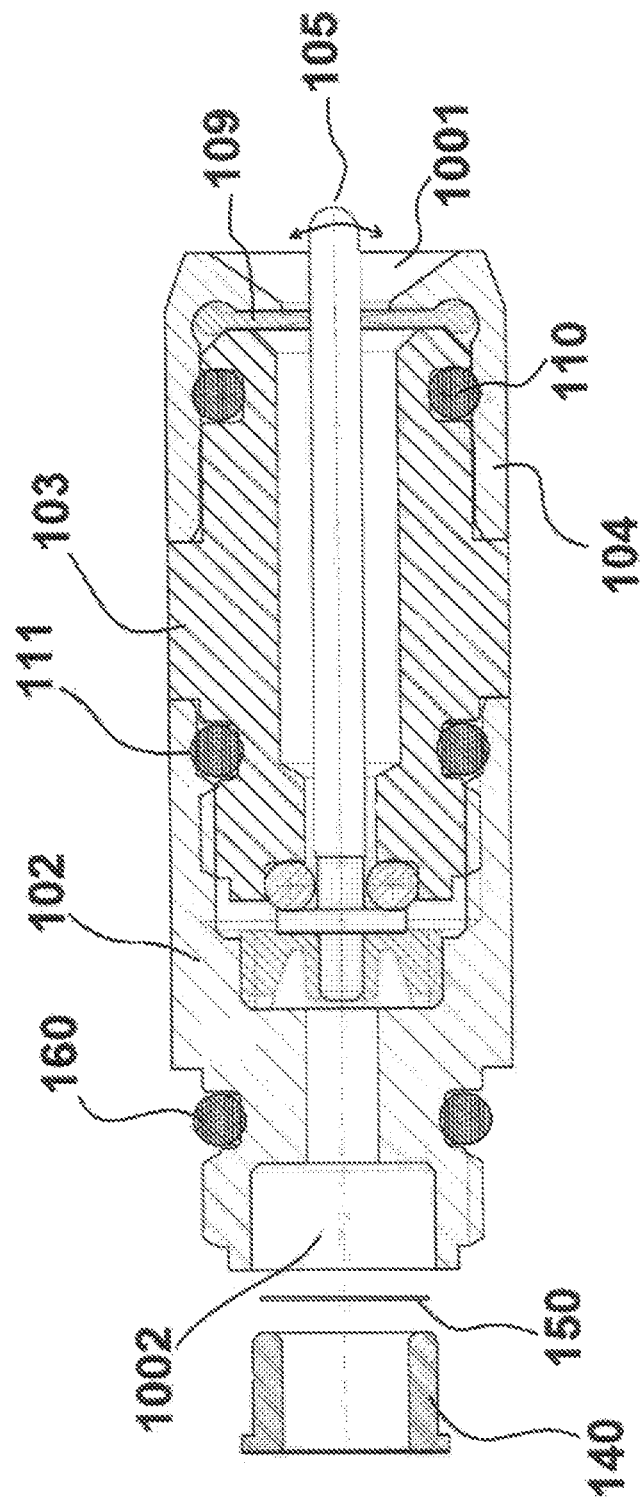
Figure 3:
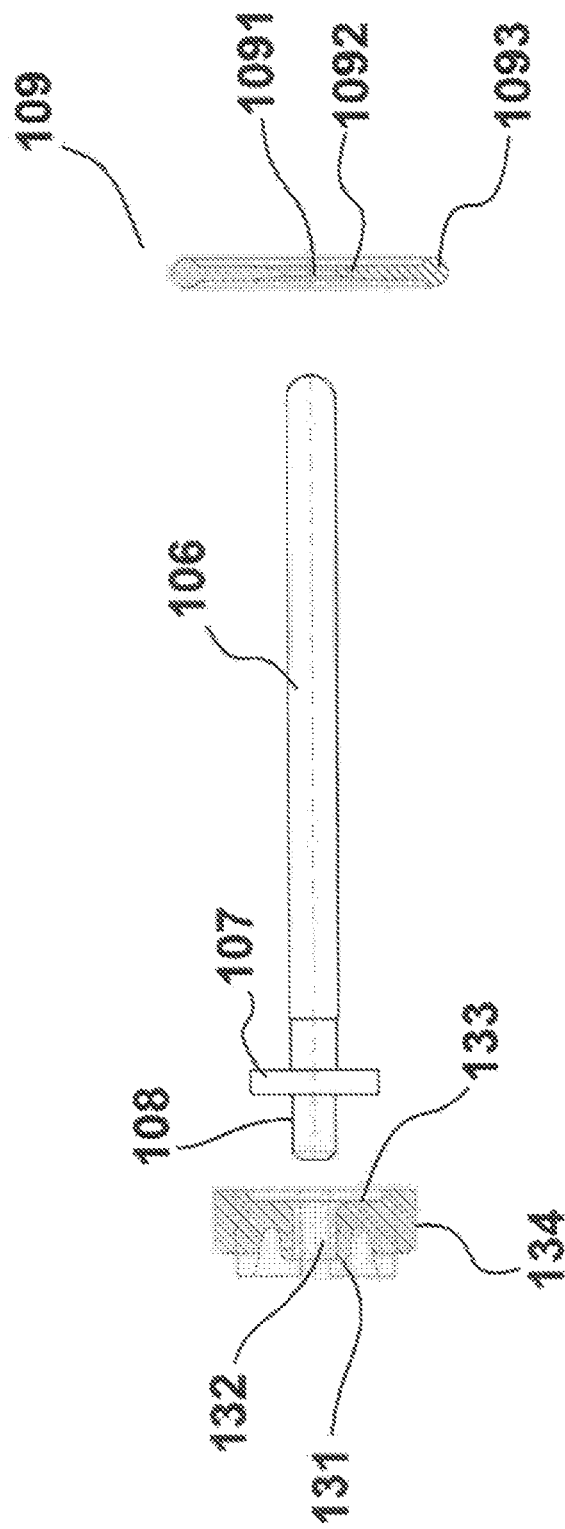
FIG. 3 shows longitudinal section views of component parts of a dispensing device according to an embodiment of the present invention.

According to the embodiment depicted in FIGS. 1, 2 and 4, the dispensing device 100 according to the present invention comprises a main body 101 constituted by a first element 102, an intermediate element 103 and an end element 104 fixed together (substantially assembled and/or partly screwed together according to procedures substantially known in themselves) so as to define a longitudinal cavity 1011 which communicates with the outside through an inlet opening 1002 and an outlet opening 1001 for introducing liquids into the cavity 1011 and discharging liquids from the cavity 1011, respectively. A first O-ring type gasket 111 is placed between the first element 102 and the intermediate element 103, a second O-ring type gasket 110 being placed between the intermediate element 103 and the end element 104, the two gaskets 111 and 110 being provided for the purpose of preventing leakage of liquids at the mutual connections between the elements 102, 103 and 104. Furthermore, a third O-ring type gasket 160 is arranged in a groove defined by the outer surface of the first element 102 in order to guarantee the hydraulic sealing between the element 102 (and therefore between the device 100) and, for example, a supply pipe (not shown) to which the device is fixed.

It can be appreciated that the flow of liquids inside the cavity 1011 will occur from the inlet opening 1002 to the outlet opening 1001 and therefore from left to right in FIGS. 1 and 2.

A valve body or element 105, a further O-ring type gasket 120 and an element 130 also named plunger for reasons which will be apparent in light of the following description are arranged or housed inside the cavity 1011. The element 130 comprises a side wall 1301, which is substantially cylindrical (FIG. 7) and is arranged abutting against a circular crown shoulder 1021 defined by the first element 102 so as to act under pressure (by virtue of the elasticity of the element 130 e.g. made of elastomeric material) against a flange 107 (head) of the valve element 105, wherein accordingly the pressure applied by the element 130 on the flange or head 107 results in a pressure applied by the flange or head 107 on the gasket 120, the gasket 120, with the valve element 105 in the position of FIGS. 1 and 2 (resting or closing) being stressed (in practice, deformed) under the bias of said pressure so as to block the flow of liquids downstream of the gasket 120 itself.

However, according to methods substantially known and therefore not described in detail for the sake of brevity, the element or valve body 105 is adapted to be switched from the position in FIGS. 1 and 2 against the elastic bias applied by the element 130 as shown by the double arrow in FIGS. 1 and 2, whilst displacements of the element 105 (in practice, misalignments) from the position in FIGS. 1 and 2, result in a reduction in the strain of the gasket 120 (in practice a loss of contact between opposing portions of the gasket 120 and the flange or head 107), and therefore in the possibility for the liquids to flow from the portion of cavity 1011 upstream of the gasket 120, into the portion downstream of the gasket 120 itself to be discharged through the opening 1001. For example, the aforesaid switching or displacements of the element 105 may be caused by thrust actions (or even small bites) applied by small animals also in this case in substantially known manners.

Hereafter, further details of component parts of the device according to the present invention will be described below with reference to FIGS. 7 and 9.

In particular, as depicted in FIG. 9, the valve element 105 comprises a needle or stem-shaped portion, from which the flange or head 107 radially extends, whereas a first portion 106 of the stem extends downstream of the head 107, while a second portion 108 of the stem extends upstream of the head 107 and therefore on the opposite side of the head 107 with respect to the first portion 106. The valve element 105 is usually made of stainless steel, whereas according to the present invention the element 105 may be made of equivalent and alternative materials.

Element 130, as depicted in FIG. 7, comprises an engagement portion 131 (see the following description) that defines a substantially cylindrical inner cavity 132 (possibly with a blind or closed end portion), and a circular crown shaped portion 133 which extends radially outside said engagement portion 131. Finally, element 130 comprises a substantially cylindrical outer wall 1301, which extends from the circular-crown-shaped base 133 in the same direction as the extension of portion 131.

Still as depicted, the outer surface of the portion 131 is frustoconical, with diameter decreasing towards the end (as said possibly blind or closed) opposite to the base 133. Furthermore, the side wall 1301 comprises a number of notches or slots 135 arranged regularly along the development of wall 1301, wherein the thickness of the wall 1301 at the notches 135 is greater than that of the portions of wall 136 adjacent to said notches.

In use, as depicted in FIGS. 1, 2 and 4, the portion 108 of the stem is housed by interference in the cavity 132 of the element 130, wherein the base 133 of element 130 is placed abutting (pushed) pushed against flange or head 107 of the element 105, the portion 106 of the element 105 extends through gasket 120. Furthermore, the notches 135 allow the passage of liquids at the portions 136 with reduced wall thickness 1301, said portions 136 not being in contact, i.e. defining the gaps, with the opposite cylindrical wall defined by the first element 102 of body 101.

Furthermore, it can be appreciated that the aforesaid switching of the valve element 105 from the resting or closing position of FIGS. 1 and 2 in their respective opening positions occur against the elastic bias applied by the element 130, whereas, on the contrary, the opposite switching of element 105 from the opening positions to the resting or closing position are promoted by the elastic thrust applied by the element 130.

As anticipated, according to an embodiment, the device according to the present invention comprises a screening element in order to prevent the deposit of detritus inside the cavity 1011, wherein said detritus, if trapped in the cavity 1011 could compromise the operation of the device 100, e.g. by blocking the element 105 in the opening position, thereby causing the continuous and uncontrolled flow of liquids. Said screening element is described below with reference to FIGS. 1, 2 and 8.

In FIGS. 1, 2 and 8, reference number 109 identifies a disc-shaped element which defines a central hole 1091. Near the through-hole 1091, the disc-shaped element 109 comprises a circular-crown-shaped portion 1092, the thickness of which increases from a minimum thickness at the hole 1091 to a maximum thickness at a predefined radial distance from the center of the hole. In the embodiment shown, said radial distance is smaller than the maximum radius of the disc-shaped element 109, wherein embodiments are possible in which said predefined radial distance substantially corresponds to the maximum radius of the disc-shaped element.

Finally, as shown, the disc-shaped element 109 comprises a substantially toroidal peripheral portion, and therefore defined by revolution of a surface at least in part cylindrical with respect to a rotation axis perpendicular to the disc-shaped element 109 itself. In practice, the thickness of the disc-shaped element 109 is maximum at the toroidal portion 1093 and in particular greater than that of both the circular-crown-shaped portion 1092 and that of the intermediate circular-crown-shaped portion 1094.

In use, the disc-shaped element 109 is fixed to the main body 101 at the outlet opening 1001 with the portion 106 of the valve body 105 which extends through the hole 1091, the diameter of the hole substantially coinciding with (or being even smaller than) the outer diameter of the portion 106 at the hole 1091. In particular, according to the embodiment as depicted, the disc-shaped element 109 is housed in the main body 101 (in the end element 104), the toroidal portion 1093 being in this case housed in a corresponding groove defined by the body 101 and/or by the element 104, the contrast between the groove and the toroidal portion 1093 preventing the accidental release of the disc-shaped element 109 from the body 101.

Moreover, as depicted, the end element 104 defines a tapered (frustoconical) inner surface 1041 with a diameter increasing towards the outlet, to which is a surface 1042 substantially perpendicular to the longitudinal axis X of the cavity 1011 is connected, while the intermediate portion 1094 (with a substantially uniform thickness) of the disc-shaped element 109 is arranged at said surface 1042.

It is therefore apparent from the above that the disc-shaped element 109, made possibly at least in part, in particular with at least the circular-crown-shaped portion of fluid-proof elastomeric material, effectively contrasts the entry of detritus and/or corpuscles into cavity 1011, particularly in view of the fact that the thickness of disc-shaped element 109 is minimal at hole 1091, the disc-shaped element 109 is therefore flexible at least at the hole 1091, so that it is possible to choose a diameter of hole 1091 which substantially coincides with the diameter of the portion of stem 106.

Furthermore, the aforesaid features, i.e. minimum thickness of the disc-shaped element 109 at the hole 1091 and/or elasticity of the disc-shaped element (e.g. made of elastomeric material), mean that the disc-shaped element does not contrast the switching of the stem or pin 105 from the closing to the opening position, moreover the edge of hole 1091 at least for small movements of the stem 105, remains substantially in contact with the stem 105 also during the switching thereof (from closing to opening and vice versa from opening to closing), thereby ensuring a screening of the cavity 1011 also during said switching.

It has moreover to be noted that the system of plunger-centering (element 130), needle (element 105) and elastic diaphragm (disc-shaped element 109): ensures the centering of all elements along the longitudinal axis of the valve (and therefore the coaxiality of the activation system);

due to the centering of all elements along the longitudinal axis of the valve, ensures uniformity of the activation force of the valve (switching of the needle 105 according to the methods described above) in all directions;

wherein the uniformity of the activation force of the valve in all directions allows the valve to deliver the same amount of water when the needle (element 105) is moved with respect to the closed position; and wherein the elastic diaphragm (element 109) makes the valve response progressive in terms of activation force and water flow rate.

In practice, due to the fact that the thickness of circular-crown-shaped portion 1092 varies from a minimum thickness at the edge of the hole 1091, the elastic response of the disc-shaped element 109 to the switching of element 105 increases proportionally to the displacement of the needle, wherein respectively greater forces are therefore required for greater displacements to increase the amount of water delivered.

On the contrary, the switching of the stem 105 from the opening to the closing positions is facilitated by the disc-shaped element 109, which therefore during aforesaid switching, acts in synergy with the plunger 130.

Further details of the device 100 according to an embodiment of the present invention are described below with reference to FIGS. 10, 11 and 2.

As depicted, in the embodiment as depicted in FIGS. 10, 11 and 2, the device comprises a rear safety filter 140 consisting of a stainless-steel mesh with micrometric mesh, co-molded on an elastomeric support. The filter 140 has the function of blocking possible impurities present in the water distribution circuit of the automatic watering system.

Downstream of the rear safety filter 140 there is a micro-perforated diaphragm 150 kept in place by the filter itself.

This element or diaphragm 150, equipped with one or more micrometric holes 151, makes it possible to equalize the water flow delivered by the device 100. The micro-perforated diaphragm 150 is sized in accordance with the mesh size of the filter to avoid the risk of clogging.

It has thus been demonstrated by means of the detailed description given above of the embodiments of the present invention depicted in the drawings that the present invention allows to achieve the predetermined objects by overcoming the drawbacks affecting the devices according to the prior art.

In particular, the present invention allows the effective protection (screening) of the cavity 1011 from detritus (by virtue of the innovative disc-shaped element 109) and/or an effective re-switching of the stem 105 from the opening to the closing positions, as well as a reliable sealing (with the stem in the closing position) and a satisfactory flow of liquids (with the stem in the opening position) by virtue of the conformation and/or of the innovative features of the plunger 130.

Although the present invention is explained above by means of a detailed description of the embodiments shown in the drawings, the present invention is not limited to the embodiments described above and shown in the drawings. On the contrary, all the modifications and/or variants of the embodiments described above and shown in the drawings which will appear obvious and immediate to a person skilled in the art are included in the scope of the present invention.

For example, wide choice is left to the person skilled in the art regarding the choice of materials for making the components of the device according to the present invention.

The scope of the present invention is thus defined by the claims.

The invention claimed is:

1. A liquid dispensing device, for selectively dispensing water to an animal, said device comprising:
   a main body which defines a longitudinal cavity for the passage of watering liquids, said longitudinal cavity being in communication with an inlet for introducing said liquids in said longitudinal cavity and an outlet for discharging said liquids from said longitudinal cavity,
   a valve body and an annular elastic sealing element arranged inside said longitudinal cavity, said valve body comprising a stem with a first portion which extends through said annular sealing element and a flange-shaped head, wherein said flange-shaped head is retained pressed against said annular sealing element by an elastic thrust element, and wherein said stem is adapted to be switched between a first closing position, in which the flow of said liquids downstream of said annular sealing element is prevented by said annular sealing element, and a second opening position, in which the flow of said liquids downstream of said annular sealing element is possible; and
   a disc-shaped element made of elastomeric material fixed to said main body at said outlet, wherein said disc-shaped element defines a central hole substantially coaxial with said longitudinal cavity through which said first portion of said stem extends, and wherein the switching of said stem from said first closing position to said second opening position occurs against an elastic bias exerted by said disc-shaped element, while, on the contrary, the switching of said stem from said second opening position to said first closing position is promoted by die elastic thrust exerted by said disc-shaped element, wherein said disc-shaped element, near said central hole, comprises an inner portion with a tapered cross-section that increase in thickness from an edge of said central hole towards an outer peripheral edge of said disc-shaped element, wherein the thickness of said inner portion of said disc-shaped element increases from a minimum thickness in a uniform manner and substantially proportionally in a radial direction from the edge of the central hole towards the outer peripheral edge.

2. The dispensing device according to claim 1, wherein at least said inner portion is made of fluid-proof elastomeric material.

3. The dispensing device according to claim 1, wherein said stem, at said hole of said disc-shaped element has an outer diameter which substantially corresponds to the diameter of said hole of said disc-shaped element.

4. The dispensing device according to claim 1, wherein said inner portion of the disc-shaped element has an inner diameter which substantially corresponds to a diameter of said central hole and an outer diameter which is smaller than a maximum diameter of said disc-shaped element.

5. The dispensing device according to claim 1, wherein said disc-shaped element is housed inside said main body.

6. The dispensing device according to claim 5, wherein said disc-shaped element, at its outer peripheral edge, comprises a substantially toroidal portion.

7. The dispensing device according to claim 6, wherein said substantially toroidal portion comprises a curved portion with respect to a rotation axis perpendicular to said disc-shaped element.

8. The dispensing device according to claim 1, wherein said elastic thrust element comprises an engagement portion which defines a substantially cylindrical stem-engagement cavity, in which a second portion of said stem opposite to said first portion is housed, and wherein said elastic thrust element comprises a circular base which extends radially from said engagement portion and is placed in contact with said flange-shaped head of said valve body on an opposite side with respect to said annular sealing element such that the flange-shaped head is positioned between the circular base and the annular sealing element.

9. The dispensing device according to claim 8, wherein said second portion of said stem is housed in said cylindrical engagement cavity of said thrust element.

10. The dispensing device according to claim 8, wherein said elastic thrust element comprises a substantially cylindrical side wall which extends from periphery of said circular base in a same direction and coaxial with said engagement portion.

11. The dispensing device according to claim 8, wherein said substantially cylindrical cavity is blind at the end of said second portion of said stem.

12. The dispensing device according to claim 8, wherein said engagement portion has a substantially frustoconical outer surface narrowing towards an end opposite to said circular base.

13. The dispensing device according to claim 10, wherein said substantially cylindrical side wall which extends from said circular base has a first height in a longitudinal direction, the substantially cylindrical side wall including a plurality of spaced-apart, outwardly extending portions having a second height in the longitudinal direction that is less than the first height of said substantially cylindrical side wall, and wherein adjacent pairs of said plurality of outwardly extending portions define a notch or slot therebetween and which extends the first height in the longitudinal direction of said substantially cylindrical side wall.

14. The dispensing device according to claim 13, wherein a thickness of said substantially cylindrical wall at said plurality of outwardly extending portions is greater than the thickness of the side wall at the adjacent notches or slots.

\* \* \* \* \*